United States Patent

[11] 3,571,611

[72] Inventors Trevor Howard Robinson
Boreham, Chelmsford;
Alan William Cameron; Philip John Fitz,
Great Baddow, Chelmsford, England
[21] Appl. No. 822,402
[22] Filed May 7, 1969
[45] Patented Mar. 23, 1971
[73] Assignee The Marconi Company Limited
London, England
[32] Priority May 17, 1968
[33] Great Britain
[31] 23,551/68

[54] TRIGGERABLE PULSE GENERATORS
10 Claims, 3 Drawing Figs.

[52] U.S. Cl. .......... 307/108, 328/67
[51] Int. Cl. .......... H03k 3/00
[50] Field of Search .......... 307/91, 106, 108, 132, 252, 270; 328/65, 67 (X)

[56] References Cited
UNITED STATES PATENTS

| | | | |
|---|---|---|---|
| 2,462,918 | 3/1949 | Stiefel .......... | 307/106 |
| 2,675,477 | 4/1954 | Teszner .......... | 307/106 |
| 2,697,171 | 12/1954 | Little et al. .......... | 307/108X |
| 3,204,201 | 8/1965 | Bahrs .......... | 307/91X |

*Primary Examiner*—Robert K. Schaefer
*Assistant Examiner*—H. J. Hohauser
*Attorney*—Baldwin, Wight & Brown

ABSTRACT: In a triggerable pulse generator for pulse modulating a VHF oscillator or amplifier a low AC voltage is rectified and fed to a charging circuit which feeds, via a pulse-forming circuit, a switching circuit. The switching circuit includes some voltage triggerable electronic switches in series and an output pulse transformer having its primary connected between the switching circuit and a capacitance in the pulse-forming circuit, the secondary being electrostatically screened from the primary. The rectifier unit, charging circuit, pulse-forming circuit and primary are in a circuit which is left "floating" in potential with respect to earth.

Inventors:
Trevor Howard Robinson
Alan William Cameron
and
Philip John Fitz
BY
Baldwin Wight Diller & Brown
ATTORNEYS

TRIGGERABLE PULSE GENERATORS

This invention relates to triggerable pulse generators suitable for use for pulse modulating very high frequency oscillators or amplifiers, such for example as magnetron or Klystron oscillators or amplifiers, which are required to produce—for example for pulse modulated high frequency communication—output pulses in response to input trigger pulses.

Figure 2:
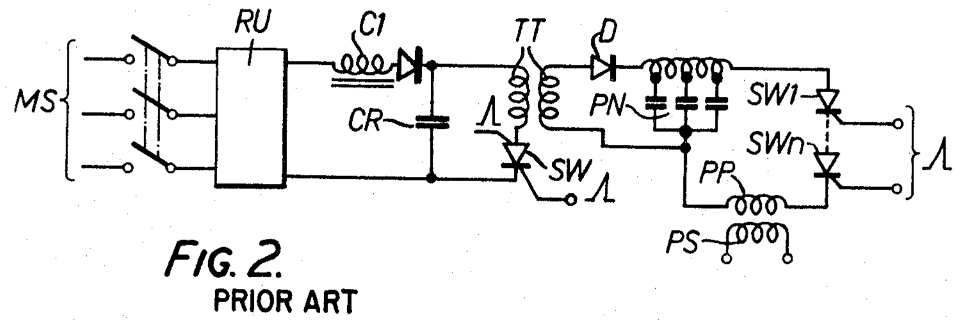
FIG. 2. PRIOR ART
Figure 3:
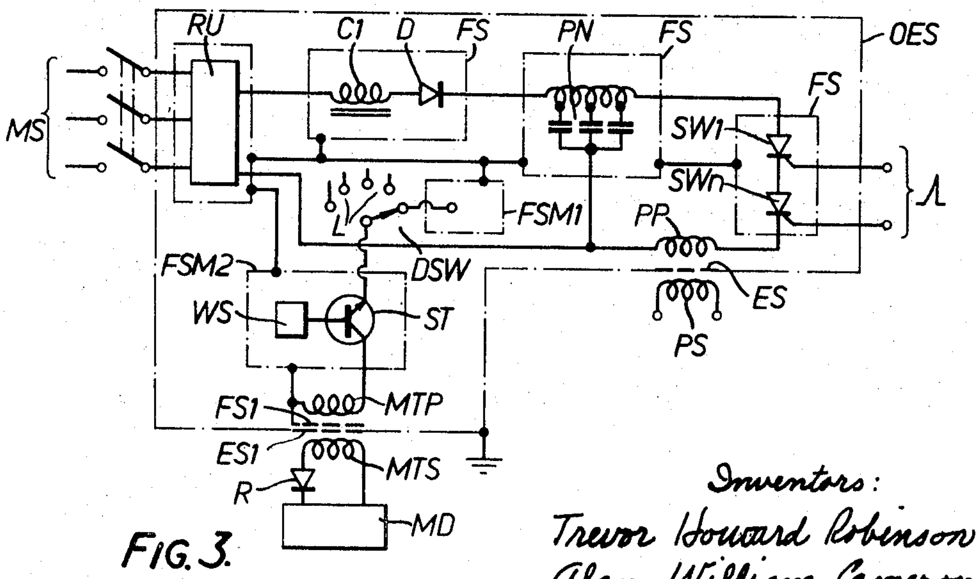

The invention is illustrated in and explained in connection with the accompanying drawings in which FIGS. 1 and 2, which are provided for purposes of introductory explanation, show diagrammatically two known pulse generators and FIG. 3 is a diagram of a preferred embodiment of this invention. Like references denote like parts in the FIGS.

Figure 1:
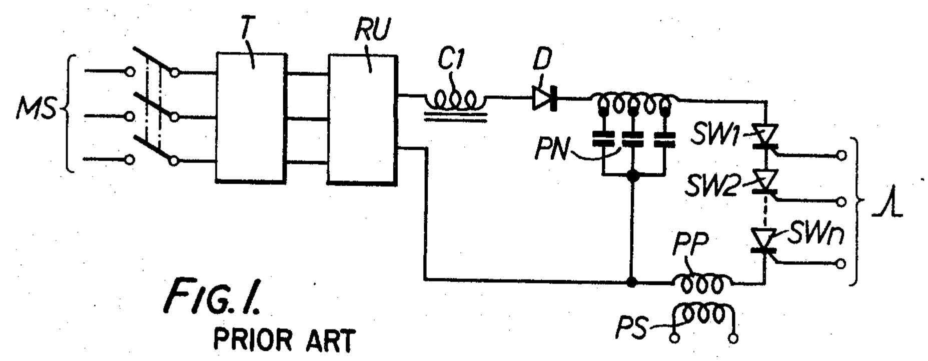
FIG. 1. PRIOR ART

Referring to FIG. 1, in the known generator represented thereby, low frequency relatively low voltage—as shown from a three phase supply fed in at MS—is applied to a voltage step-up transformer T of required high ratio, the output from which is rectified and smoothed by a rectifier and smoothing unit RU and fed to a charging inductance C1 which is connected through an isolating element shown as a diode D (though it could be constituted by a thyristor or a saturable inductance) to a pulse-forming network PN of known kind and shown as consisting in effect of a series inductance and distributed shunt capacitance represented in FIG. 1 by three capacitors connected to three different points along the inductance. The far end of this inductance is connected to a voltage-triggerable electron switch, or, in the case of a high-voltage arrangement as illustrated, by a series of voltage-triggerable simultaneously triggered electron switches SW1, SW2—SW*n*. The switch or switches may each be constituted by a triggerable thyristor. Triggering is effected by modulating pulses applied to the switch (if there is only one) or to all the switches simultaneously (if there is more than one) as indicated. The load (not shown) which may be, for example, the cathode-collector voltage supply circuit of a Klystron amplifier or the cathode-anode voltage supply circuit of a magnetron oscillator, is fed with high-voltage pulses from the secondary PS of a pulse transformer the primary PP of which is connected as shown between the capacitance incorporated in the pulse-forming network PN and the switch or (if there is more than one) the last of the series connected switches.

This known arrangement has the serious practical disadvantages that the initial step-up transformer is necessarily heavy, bulky and costly and that all the elements following it in the circuit operate at high voltage so that they must be well insulated. This again involves undesirable weight, bulk and cost.

FIG. 2 shows a known proposal which has been made to reduce the problem of insulation. In this known arrangement the low frequency transformer T of FIG. 1 is dispensed with and, instead, there is employed a high frequency high ratio step-up transformer TT. An additional reservoir condenser CR connected as shown stores voltage produced at the output side of the inductance C1 and in the primary circuit of the transformer TT is connected a fast charging switch, constituted for example by a pulse triggered thyristor SW. The secondary of the transformer TT feeds into the pulse-forming network PN through the isolator D. The rest of the circuit is as in FIG. 1.

This known circuit has the advantages over FIG. 1 that there is a high frequency transformer instead of a low frequency one and the only elements having to be insulated against high voltage are the secondary of the transformer TT and the elements in the circuits following it. Insulating difficulties and costs are therefore substantially reduced though they are still present. Moreover there are now two storing devices instead of one—the reservoir condenser CR and the capacitance incorporated in the pulse-forming network PN—and, moreover, there is the added fast charging switch SW. Although the transformer TT should be smaller and less costly than the transformer T of FIG. 1 it still has to be provided and is not inexpensive.

According to this invention a triggerable generator suitable for use for pulse modulating a very high frequency oscillator or amplifier comprises a rectifier unit which is fed from a supply of relatively low AC voltage, a charging circuit fed from said rectifier unit, a pulse-forming network fed from said charging circuit and feeding into a switching circuit including one or more voltage triggerable electronic switches in series in said circuit and an output pulse transformer having a primary connected between said switching circuit and the capacitance incorporated in said pulse-forming network and a secondary which is electrostatically screened from said primary by an earthed screen, the aforesaid rectifier unit, charging circuit, pulse-forming network, switching circuit and primary being in a circuit which is left "floating" in potential with respect to earth and the output pulse transformer being the only transformer provided.

The invention has the advantages that the only transformer is the output pulse transformer; none of the circuit elements preceding the output pulse transformer has to operate at high voltage so that insulating difficulties are reduced to a minimum; and there is only one step of storage, namely that in the pulse-forming network.

A preferred embodiment of the invention comprises a "-floating" circuit including a rectifying and smoothing unit, a charging inductance fed therefrom and feeding into a pulse-forming network, a switching circuit following said pulse-forming network and comprising at least one voltage-triggerable thyristor and a pulse output transformer primary between said switching circuit and the capacitance incorporated in said pulse-forming network said pulse output transformer having a secondary which is electrostatically screened from the primary by an earthed screen.

An idea of the practical advantage as regards avoidance of insulation difficulties, which the invention can provide will be seen from the fact that, assuming for example an input of about 400 volts AC to the rectifier unit, there will be only about 1,100 volts across the switching circuit and about half this across the primary of the pulse output transformer despite that the output voltage across its secondary may be 30 to 50 kv.

In many cases it may be required to monitor the voltages produced at various different points of the circuitry preceding the pulse output transformer of a generator in accordance with this invention. This presents difficulties with ordinary monitoring circuits because the whole of the circuitry from and including the rectifier unit to and including the primary of said output transformer is "floating" in voltage with respect to earth. These difficulties are overcome according to a subordinate feature of the invention, by providing means for at will taking voltage from a desired point in the "floating" circuitry of the generator or from a reference voltage source, means for chopping the voltage thus taken, and an additional transformer having a primary fed with the chopped taken voltage and a secondary which is screened from the primary by two electrostatic screens one of which is earthed and the other of which is also floating, said secondary providing voltage for monitoring. The chopping means can conveniently comprise a switching transistor switched by a locally generated switching waveform. The reference voltage could be, for example, provided by a Zener diode.

In carrying out this invention any means known per se may be provided for stabilizing the generated pulses in amplitude. For example a coil coupled to the charging inductance could be provided in series with a voltage-triggerable additional switch, such as a triggerable thyristor, and means provided for automatically triggering this additional switch to the conductive state when the voltage at the pulse-forming network rises above a predetermined reference voltage value. Such stabilizing means form per se no part of this invention and will therefore not be further described herein beyond the statement that, when provided, (as in practice they usually will be) they will also be part of the "floating" circuitry.

FIG. 3 is a diagram of one embodiment of this invention The particular embodiment shown in FIG 3 includes an arrangement, which is, of course, optionally provided, for enabling monitoring to be effected.

Referring to FIG. 3 the rectifying and smoothing unit RU is followed in turn by the charging inductance C1, the isolator D, the pulse-forming network PN, one or (as shown) a series of simultaneously triggered thyristors SW1 to SW*n* and the primary PP of an output pulse transformer, the last mentioned being connected between the last switch SW*n* and the capacitance incorporated in the pulse-forming network. Means (not shown) such as those already mentioned hereinbefore, may be (and usually will be) provided as known per se for stabilizing the output pulses in amplitude. It will be observed that, in the circuitry so far described there is no transformer preceding the primary of the output pulse transformer. It will also be observed that the whole of the circuitry so far described is "floating" in potential with respect to earth. The various elements or units incorporating the circuitry so far described may be housed in screening housings and such screening housings are indicated by chain line blocks referenced FS. These screens are connected together but they are not earthed. Output pulses are taken off from the secondary PS of the large ratio step-up output pulse transformer, which is the only transformer in the pulse generator, and it is not until this secondary is reached that any really high voltage appears. In the example of the invention at present being described the voltage across the secondary PS is of the order of 30 to 50 kv. No voltages of this order appear anywhere else. Assuming the input three-phase voltage at MS to be about 400 volts there will be only $2 \times \sqrt{2} \times 400$ i.e. about 1,100 volts across the series of switches SW1 to SW*n* and only about half this across the primary PP. Insulation problems are therefore very much reduced indeed as compared to these in the known arrangement of FIG. 1 and are substantially less than those in the known arrangement of FIG. 2. The output pulse transformer has an earthed electrostatic screen, indicated by the broken line ES and, as shown, this is connected to an outer screening housing OES which encloses everything except the secondary PS.

In the embodiment described the portion of the circuit operating at a potential "floating" with respect to earth is operated at a low potential, and is thus susceptible to noise signals capacitively induced in the circuit by nearby high-voltage elements. The electrostatic screening is provided to isolate that portion of the circuit which is of "floating" potential thereby to minimize the production of noise signals therein. The electrostatic screening also desirably reduces instabilities caused in the output from the pulse output step-up transformer which might result from disturbances caused by the "-floating" action of that portion of the circuit which is "floating."

The monitoring provisions will now be described. A distributor switch DSW has one of its contacts connected to a reference voltage source (not separately shown) which is housed in an unearthed screening housing FSM1 which is connected to the unearthed screens FS and, like those, is inside the earthed outer screen OES. The other contacts of the switch DSW are connected to leads L which are shown open ended so as not to complicate the drawing but which lead to the various points in the "floating" circuitry where voltages may be required to be monitored. Output from the armature of the switch DSW is fed to a chopper shown as consisting of a switching transistor ST driven, i.e. open and closed successively, by a switching waveform from a suitable waveform source WS. This chopper is shown within the screening housing FSM2 which is also connected to the unearthed screens FS. The chopped output is fed to the primary MTP of a transformer the secondary MTS of which is screened from the primary by two electrostatic screens one of which, FS1, connected to the unearthed screening housings and the other of which, FS1 is earthed. The output of the secondary MTS is used for monitoring. As shown it is rectified by a rectifier R, smoothed by a suitable smoothing filter and passed to any convenient monitoring or measuring device MD, such as an oscilloscope. The smoothing filter is not separately shown, being assumed to be incorporated in the block MD. As will now be apparent this arrangement allows voltages at any desired predetermined point in the "floating" circuitry to be monitored with respect to the reference voltage despite that the said point is in a circuit which is "floating" with respect to earth.

The output from the transformer secondary PS is, of course, applied to the very high frequency oscillator or amplifier (not shown) to be pulse modulated. This might be, for example, a very high frequency magnetron oscillator, in which case the output from PS would be applied as cathode-anode voltage to the magnetron or, to quote another example, it could be a very high frequency Klystron amplifier, in which case the output from PS would be applied as cathode-collector voltage to the Klystron.

We claim:

1. A triggerable high-voltage generator suitable for pulse modulating a very high frequency oscillator or amplifier comprising a rectifier unit which is fed from a supply of relatively low AC voltage, a charging circuit fed from said rectifier unit, a pulse-forming network fed from said charging circuit and feeding into a switching circuit including one or more voltage-triggerable electronic switches in series in said circuit and an output pulse step-up transformer having a primary connected between said switching circuit and capacitance incorporated in said pulse-forming network and a secondary which is electrostatically screened from said primary by an earthed screen, the aforesaid rectifier unit, charging circuit, pulse-forming network, switching circuit and primary being in a circuit which is left "floating" in potential with respect to earth and the output pulse step-up transformer being the only transformer provided.

2. A generator as claimed in claim 1 and comprising a "-floating" circuit including said rectifying unit and a smoothing unit, said charging circuit including a charging inductance fed from said smoothing unit and feeding into said pulse-forming network, said switching circuit following said pulse-forming network and comprising at least one voltage-triggerable thyristor and said output pulse step-up transformer primary between said switching circuit and said capacitance incorporated in said pulse-forming network, said output pulse step-up transformer having said secondary which is electrostatically screened from the primary by said earthed screen.

3. A generator as claimed in claim 2 and including means for at will taking voltage from a desired point in the "floating" circuitry of the generator or from a reference voltage source, means for chopping the voltage thus taken, and an additional transformer having a primary fed with the chopped taken voltage and a secondary which is screened from the primary by two electrostatic screens one of which is earthed and the other of which is also floating, the last said secondary providing voltage for monitoring.

4. A generator as claimed in claim 3 and wherein the chopping means comprises a switching transistor switched by a locally generated switching waveform.

5. A generator as claimed in claim 4 and wherein said reference voltage source comprises a Zener diode.

6. A generator as claimed in claim 5 and wherein a coil coupled to said charging inductance is provided in series with a voltage-triggerable additional switch and means provided for automatically triggering this additional switch to the conductive state when the voltage at the pulse-forming network rises above a predetermined reference voltage value.

7. A generator as claimed in claim 1 and wherein said earthed screen is conductively connected to an earthed outer screen which encloses said rectifier unit, said charging circuit, said pulse-forming network and said switching circuit.

8. A generator as claimed in claim 2 and wherein said earthed screen is conductively connected to an earthed outer screen which encloses said rectifying unit, said smoothing unit, said charging circuit, said pulse-forming network and said switching circuit.

9. A generator as claimed in claim 3 wherein said earthed screen and the said one of said electrostatic screens are both connected to an earthed outer screen which encloses said rectifying unit, said smoothing unit, said charging circuit, said pulse-forming network, said switching current, said means for chopping and the other of said electrostatic screens which is floating.

10. A generator as claimed in claim 2 and including means for at will taking voltage from a desired point in the "floating" circuitry of the generator or from a reference voltage source, means for chopping the voltage thus taken, and an additional transformer having a primary fed with the chopped taken voltage and a secondary which is screened from the primary by the electrostatic screens one of which is earthed and the other of which is also floating, the last-said secondary providing voltage for monitoring.